US006305136B1

United States Patent
Hopton et al.

(10) Patent No.: US 6,305,136 B1
(45) Date of Patent: Oct. 23, 2001

(54) REINFORCING MEMBER WITH BEAM SHAPED CARRIER AND THERMALLY EXPANSIBLE REINFORCING MATERIAL

(75) Inventors: Gregory W. Hopton, Novi, MI (US); Norman E. Blank, Wayne, NJ (US); Gerald Fitzgerald, Clinton Township, MI (US); Randy Stratman, Waterford, MI (US); Chin-Jui Chang, Troy, MI (US)

(73) Assignee: Sika Corporation, Madison Heights, MI (US)

( * ) Notice: Subject to any disclaimer, the term of this patent is extended or adjusted under 35 U.S.C. 154(b) by 0 days.

(21) Appl. No.: 09/496,001

(22) Filed: Jan. 31, 2000

(51) Int. Cl.⁷ ...................................... E04C 1/00
(52) U.S. Cl. ................. 52/309.7; 52/309.8; 296/203.01; 296/205; 296/182; 296/146.6
(58) Field of Search .............................. 296/182, 203.01, 296/205, 146.6; 52/481.1, 309.7, 309.8, 793.1, 729.1, 730.2, 309.4

(56) References Cited

U.S. PATENT DOCUMENTS

| 3,434,258 | * | 3/1969 | Leurent | 52/397 |
|---|---|---|---|---|
| 3,493,257 | | 2/1970 | Fitzgerald et al. | 293/71 |
| 4,019,301 | | 4/1977 | Fox | 52/725 |
| 4,610,836 | | 9/1986 | Wycech | 264/313 |
| 4,695,343 | | 9/1987 | Wycech | 156/196 |
| 4,732,806 | | 3/1988 | Wycech | 428/241 |
| 4,737,407 | | 4/1988 | Wycech | 428/323 |
| 4,751,249 | | 6/1988 | Wycech | 521/54 |
| 4,769,391 | | 9/1988 | Wycech | 521/54 |
| 4,836,516 | | 6/1989 | Wycech | 267/279 |
| 4,853,270 | | 8/1989 | Wycech | 428/68 |
| 4,861,097 | | 8/1989 | Wycech | 296/188 |
| 4,862,660 | * | 9/1989 | Raymond | 52/221 |
| 4,901,500 | | 2/1990 | Wycech | 52/793 |
| 4,908,930 | | 3/1990 | Wycech | 29/527.2 |

(List continued on next page.)

FOREIGN PATENT DOCUMENTS

| 2114888 | | 2/1994 | (CA) . | |
| 2749263 | * | 5/1996 | (FR) | 296/187 |
| 11-13186 | * | 1/1999 | (JP) | 52/22 |

OTHER PUBLICATIONS

Side view photograph of admitted prior art automobile rail reinforcing member with adhesively attached thermally expandable reinforcing material after bake–out but not shown positioned within the rail.

Perspective view of admitted prior art automobile rail reinforcing member with adhesively attached thermally expandable reinforcing material after bake–out but not shown positioned within the rail.

Photograph of section of admitted prior art SUV crossmember reinforcing member with adhesively attached thermally expandable material after bake–out located between metal structural parts of an automobile.

*Primary Examiner*—Carl D. Friedman
*Assistant Examiner*—N. Slack
(74) *Attorney, Agent, or Firm*—Hovey, Williams, Timmons & Collins

(57) ABSTRACT

A reinforcing member for a structural component such as a rail or channel of a vehicle is provided which includes a carrier and a thermally expansible structural reinforcing material element which is fastened to the carrier by mechanical fixation or an adhesive. The mechanical fixation may be provided by a flange or other mechanical connection on the carrier or by a fastener such as a push pin extending through aligned holes and openings in the carrier and foamable material. The push pins are preferably of a synthetic resin material which more closely approximates the heat conductivity of the foamable material when the latter is activated by heat, and is sufficiently yieldable to absorb impacts to the foamable material during installation.

28 Claims, 7 Drawing Sheets

U.S. PATENT DOCUMENTS

| | | | |
|---|---|---|---|
| 4,922,596 | 5/1990 | Wycech | 29/897.2 |
| 4,923,902 | 5/1990 | Wycech | 521/54 |
| 4,964,514 | 10/1990 | Wycech | 206/564 |
| 4,978,562 | 12/1990 | Wycech | 428/35.8 |
| 4,995,545 | 2/1991 | Wycech | 228/119 |
| 5,124,186 | 6/1992 | Wycech | 428/35.8 |
| 5,194,199 | 3/1993 | Thum | 264/46.6 |
| 5,213,391 | 5/1993 | Takagi | 296/205 |
| 5,344,208 | 9/1994 | Bien et al. | 296/187 |
| 5,575,526 | 11/1996 | Wycech | 296/205 |
| 5,635,562 | 6/1997 | Malcolm | 525/108 |
| 5,660,901 * | 8/1997 | Wong | 428/35.7 |
| 5,755,486 | 5/1998 | Wycech | 296/188 |
| 5,766,719 | 6/1998 | Rimkus | 428/71 |
| 5,806,915 | 9/1998 | Takabatake | 296/187 |
| 5,884,960 | 3/1999 | Wycech | 296/146.6 |
| 5,888,600 | 3/1999 | Wycech | 428/35.9 |
| 5,992,923 | 11/1999 | Wycech | 296/188 |
| 6,003,274 | 12/1999 | Wycech | 52/232 |
| 6,058,673 | 5/2000 | Wycech | 52/721.4 |
| 6,092,864 | 7/2000 | Wycech et al. | 296/204 |

* cited by examiner

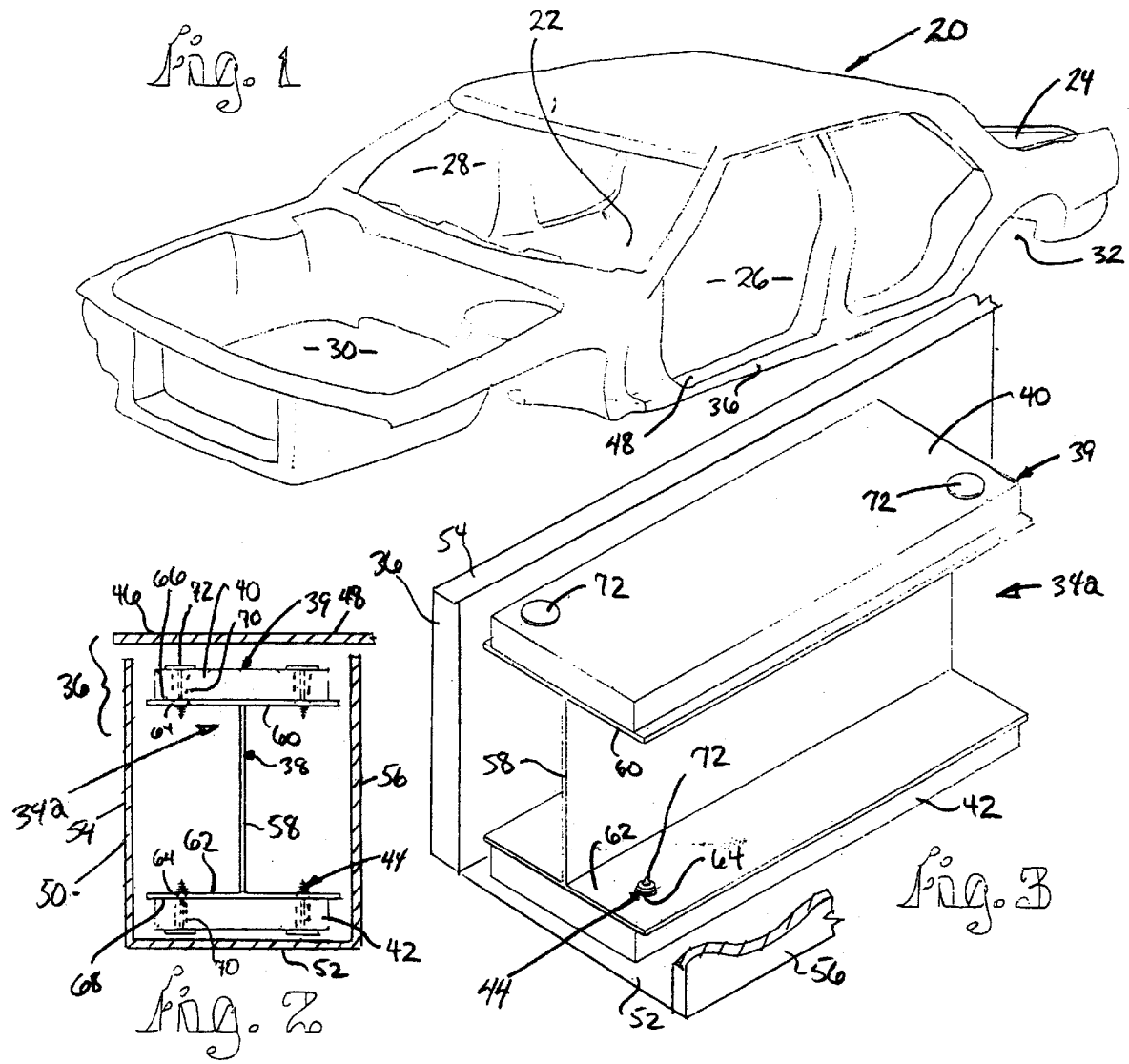
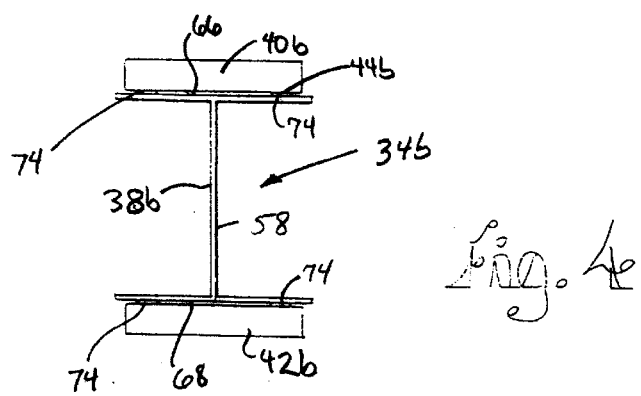

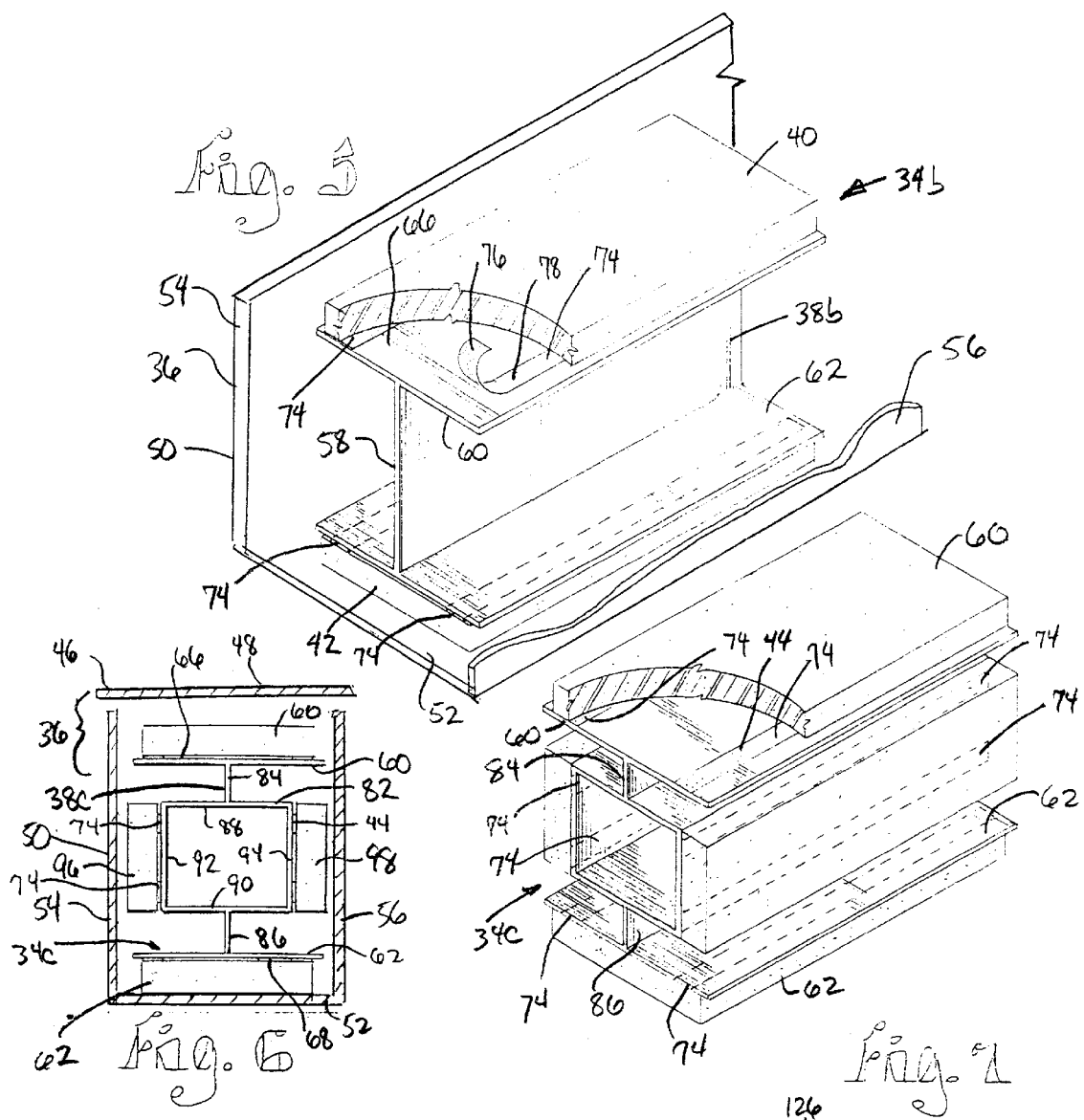
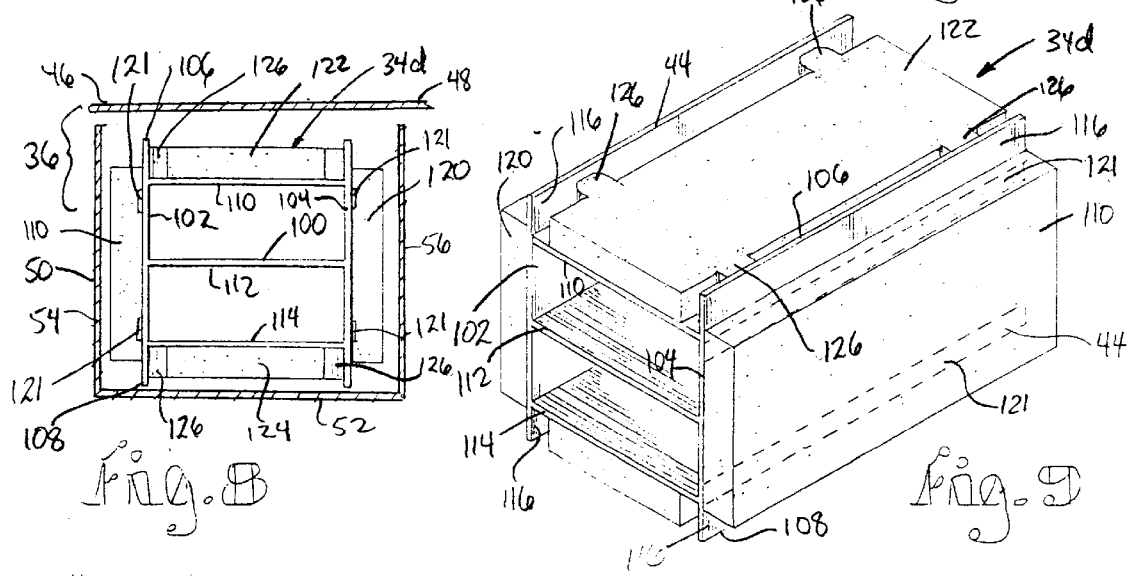

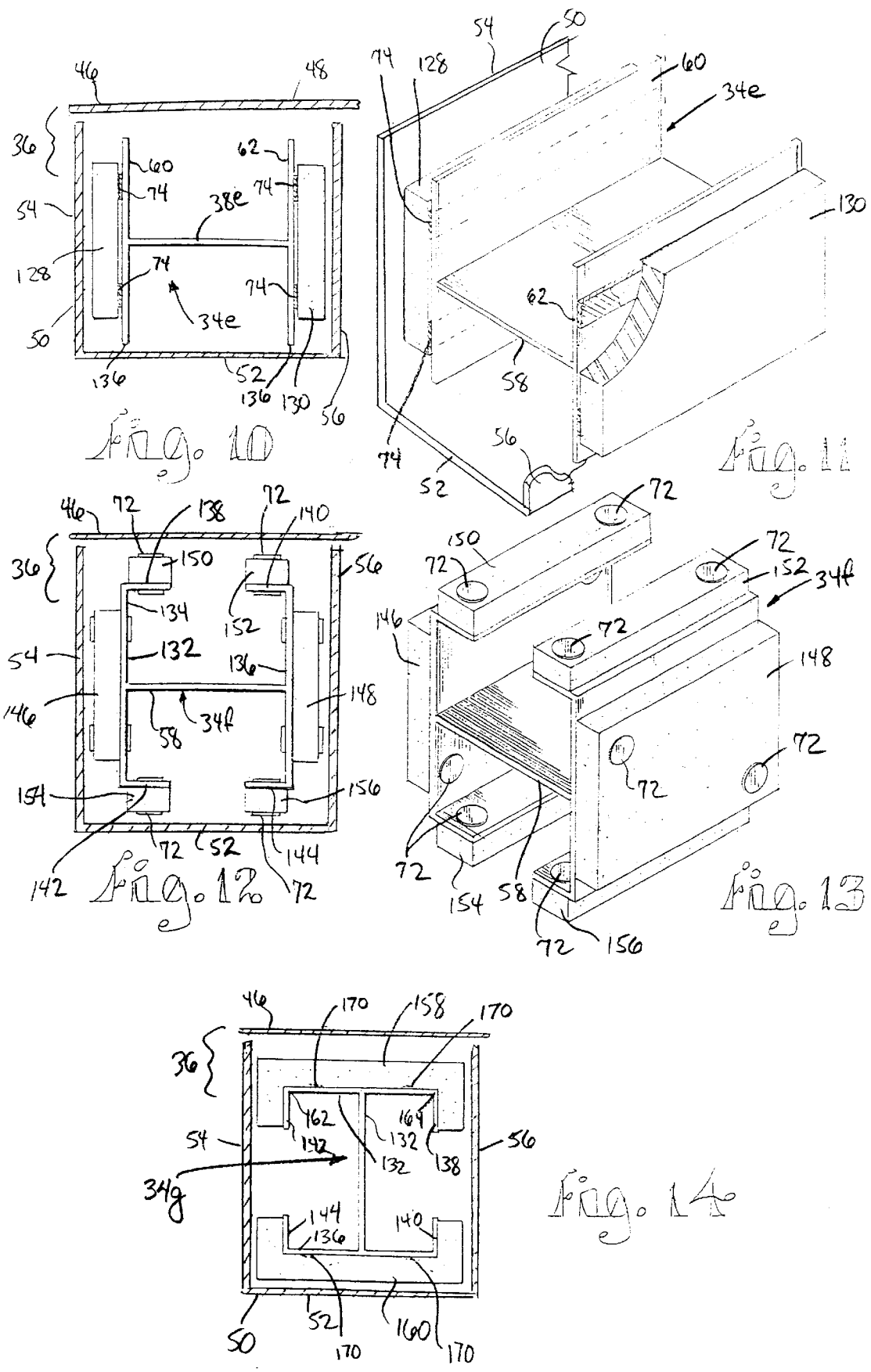

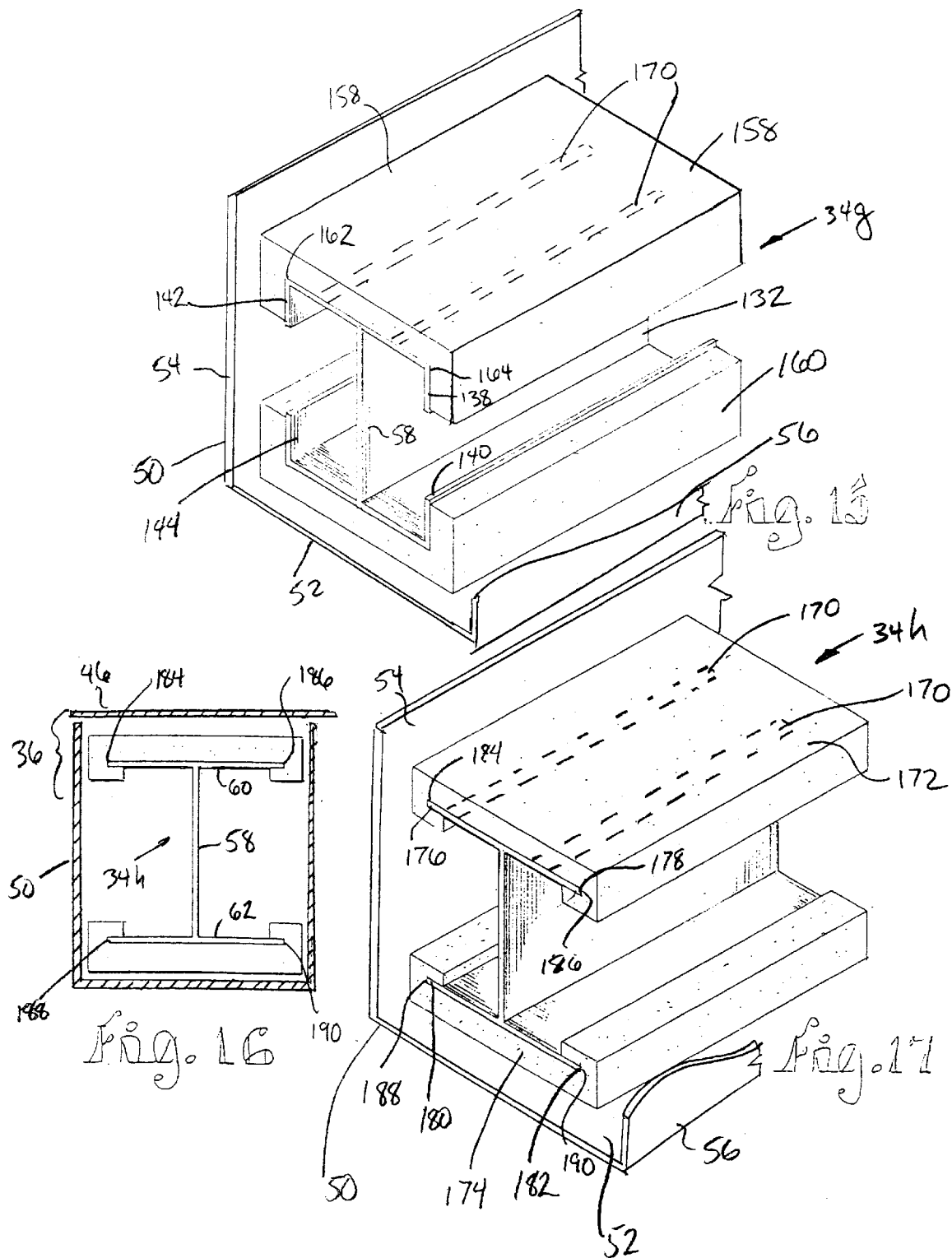

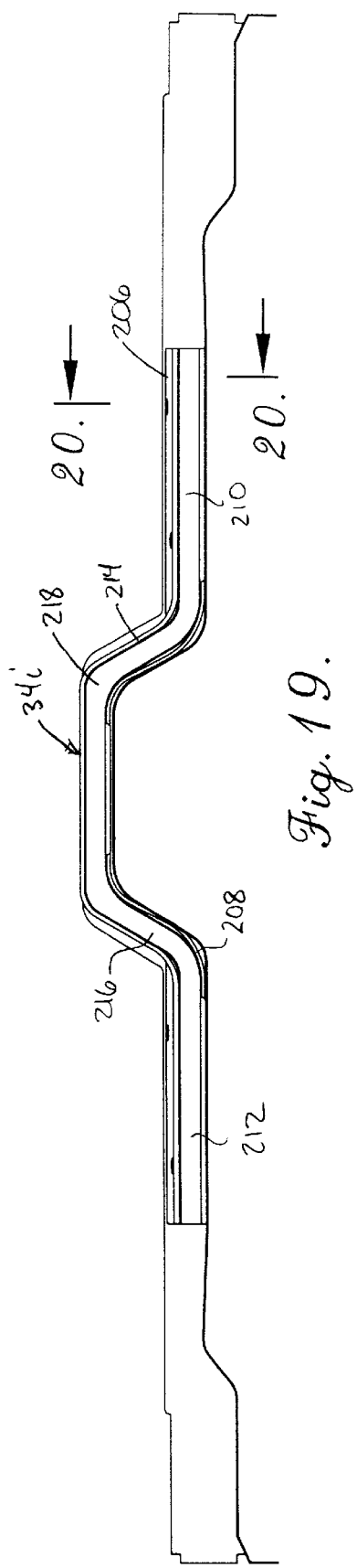
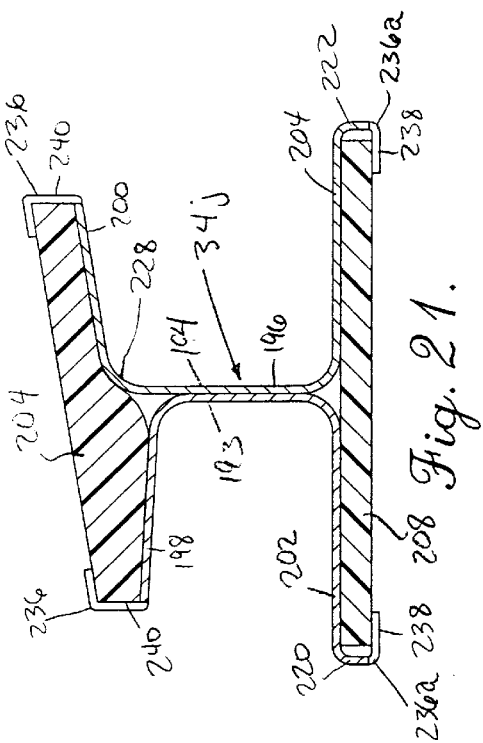
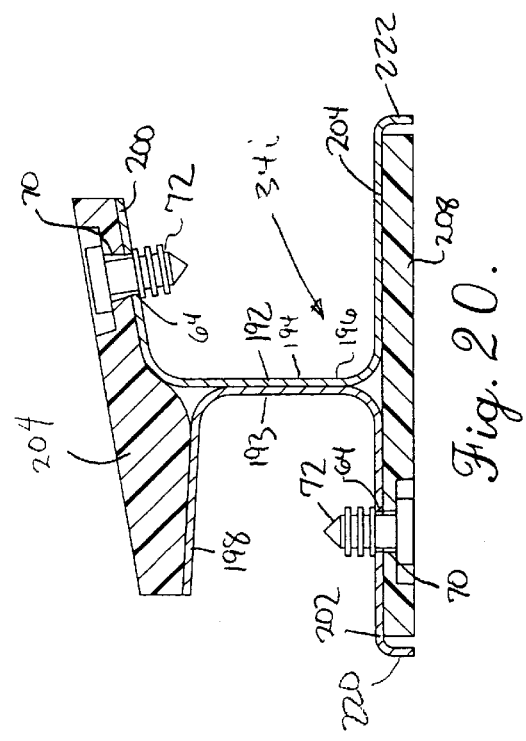

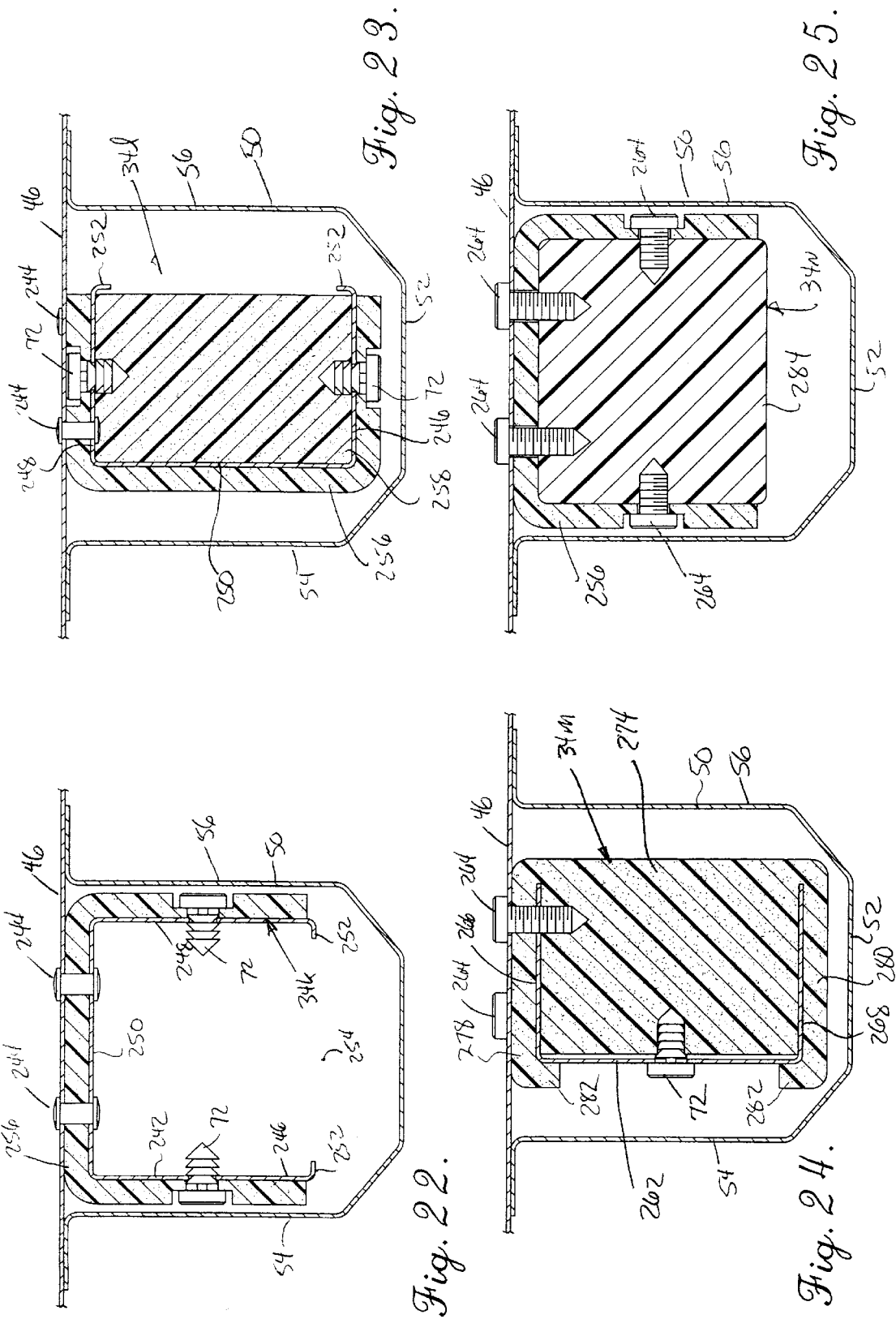

REINFORCING MEMBER WITH BEAM SHAPED CARRIER AND THERMALLY EXPANSIBLE REINFORCING MATERIAL

BACKGROUND OF THE INVENTION

1. Field of the Invention

This invention concerns the use of thermally expansible foaming materials, particularly thermally expansible foaming structural reinforcing materials, which are coupled to a beam-shaped carrier by a separate fastening means to provide additional localized stiffness to frames, rails, cavities and other structural members. Such a member may be useful in architectural, automotive, aviation, marine, or any other applications where increased support or stiffness would reduce vibration, noise, and/or fatigue propagation, or would provide reinforcement to enhance structural strength or provide energy management during crash, crush or impact encounters.

2. Description of the Prior Art

It has long been recognized that foamable materials may be used to bond together separate components. Structural foams, urethanes, and thermally expansible foaming materials have been used to enhance acoustic performance and provide structural rigidity. Examples of the use of thermally expansible structural reinforcing materials used on carriers in the automotive field are illustrated in U.S. Pat. No. 5,194,199 to Thum, U.S. Pat. No. 5,344,208 to Bien et al., and U.S. Pat. Nos. 5,575,526 and 5,755,486 to Wycech. Another example of the use of thermally expansible materials on a carrier and used primarily as a baffle composition is shown in U.S. Pat. No. 5,506,025 to Otto et al. An example of the use of foamable material on a beam-shaped structure in a piling is shown in U.S. Pat. No. 4,019,301 to Fox et al.

While such showings disclose various uses of expandable materials in reinforcing, baffling and sealant applications, there has developed a need for a simplified reinforcing member which will provide stiffening and reinforcement to a surrounding structural member. The use of expansible reinforcing materials which are initially dry and non-tacky are preferred in the manufacturing context. Such materials have shipping and handling advantages, notably this type of reinforcing material does not readily adhere to shipping containers, to workers during manufacture and installation, or to other critical surfaces which may come into contact with the material. By being non-tacky, these materials will not readily retain dirt dust or other contaminants. Additionally, these materials will not readily adversely adhere to a carrier positioned within the structural member which helps to position the reinforcing member prior to expansion of the reinforcing material.

SUMMARY OF THE INVENTION

The reinforcing member of the present invention provides significant advantages in manufacturing, handling and use over prior carrier and expansible foaming reinforcing material combinations. In particular. the present invention enjoys the benefits of utilizing an initially non-tacky reinforcing composition and a carrier which readily receives the material, enables its orientation to be presented and bond to against various opposing surfaces of an adjacent or surrounding structural member after foaming and expansion, and provides excellent load distribution to stiffen and reinforce the structural member.

Broadly speaking, the present invention includes a beam shaped carrier, thermally expansible foaming reinforcing material for bonding to and interconnecting the carrier to a structural member, and fastening means separate from the reinforcing material for holding the reinforcing material on the carrier. The beam shaped carrier can be variously configured to conforming to or be different from the opposing surface of the structural member which is to be reinforced, and as used herein includes not only conventional I-beam shapes, but also beams which present additional strengthening components and surfaces for attachment of the reinforcing material thereto. and substantially solid block-shaped beams. The reinforcing material is preferably initially non-tacky and is thermally expansible and foams, such as by internal chemical reaction or more preferably by the external application of heat. The attachment means may be provided as a mechanical attachment which is separate from the carrier or incorporated therein, such as by bendable tabs, or by a separate adhesive which is provided as tape or lines of adhesive and does not interfere with the bonding of the reinforcing material to the carrier. When a mechanical fastener such as a push pin is used, passages in the reinforcing material permit the fastener to pass therethrough and to secure the reinforcing material to the carrier. The reinforcing member is typically positioned within a cavity of a surrounding structural member. Upon heating to activate the reinforcing material, the reinforcing material foams, expands and bonds to the carrier and the structural member to provide a reinforced structural member.

The reinforcing material is thermally expansible, either by internally created thermal energy or by the external application of heat to activate the material. As used herein, the term "thermally expansible" means both internally created thermal energy and the external application of heat to expand and foam the reinforcing material. The thermally expansible reinforcing material is preferably a synthetic resin-based material which foams when subjected to temperatures achieved during baking in a manufacturing process (e.g., such as during the paint and powder coat bake stage of automobile manufacturing processes). Thus, the expansion temperature of the material should be at least about 300° F.

These and other advantages will be readily appreciated by those skilled in the art with reference to the drawings and the following description, which are intended to be exemplary rather than limiting.

BRIEF DESCRIPTION OF THE DRAWINGS

FIG. 1 is a front perspective view of an automobile body, illustrating various locations into which a reinforcing member of the present invention may be utilized;

FIG. 2 is a front elevation view of a reinforcing member of the present invention having thermally expansible structural reinforcing material elements coupled by fasteners to a beam shaped carrier and located within a channel-shaped structural member having a plate enclosing the channel onto which the plate is placed;

FIG. 3 is a perspective view of the reinforcing member of FIG. 1, with portions of one of the side walls of the channel broken away and foreshortened for clarity;

FIG. 4 is a front elevational view of a reinforcing member showing a second embodiment of the present invention wherein the thermally expansible structural reinforcing material elements are coupled to the carrier by strips of structural tape;

FIG. 5 is a perspective view of the reinforcing member of FIG. 4 positioned in a channel-shaped structural member, with portions of the structural member foreshortened and one side wall broken away for clarity;

FIG. 6 is a front elevational view of a reinforcing member in accordance with a third embodiment of the present invention, the carrier including a box beam central portion and having thermally expansible structural reinforcing material elements attached thereto by structural tape, the reinforcing member being located within a channel shaped structural member with a plate enclosing the channel;

FIG. 7 is a perspective view of the reinforcing member shown in FIG. 6;

FIG. 8 is a front elevational view of a reinforcing member in accordance with a fourth embodiment of the present invention wherein the carrier includes upright walls for providing a friction fit to locating and fasten the thermally expansible reinforcing material element thereon, the reinforcing member shown positioned within a channel-shaped structural member:

FIG. 9 is a perspective view of the reinforcing member shown in FIG. 8;

FIG. 10 is a front elevational view of a fifth embodiment of the present invention, slowing the carrier having two upright walls for positioning the reinforcing material elements adjacent the side walls of the structural member into which it is received;

FIG. 11 is a perspective view of the reinforcing member shown in FIG. 10, with portions of the channel member foreshortened and broken away for clarity and showing the use of structural tape to fasten the reinforcing material elements to the carrier;

FIG. 12 is a front elevational view of a reinforcing member in accordance with a sixth embodiment of the present invention, wherein the beam carrier presents opposed legs inwardly extending from the carrier end walls with the reinforcing material elements attached by mechanical fasteners to the legs, the reinforcing member being shown within a channel shaped structural member;

FIG. 13 is a perspective view of the reinforcing member shown in FIG. 12;

FIG. 14 is front elevational view of a seventh embodiment of the present invention, wherein the beam-shaped carrier includes opposed legs and the reinforcing material elements are adhesively attached to the carrier, the reinforcing member being shown received within a channel-shaped structural member;

FIG. 15 is a perspective view thereof, with portions of the structural member broken away and foreshortened for clarity;

FIG. 16 is a front elevational view of a reinforcing member in accordance with an eighth embodiment of the present invention, wherein the thermally expansible structural reinforcing material elements are configured to include a slot to provide a mechanical attachment to the carrier, and shown within a channel-shaped structural member;

FIG. 19 is a vertical elevational view of the reinforcing member of FIG. 18 with one side wall of the channel-shaped structural member removed for clarity to show its positioning, within the channel prior to foaming and expansion of the reinforcing material;

FIG. 20 is an enlarged vertical cross-sectional view showing the reinforcing member of FIG. 18 with the structural reinforcing material elements attached to the carrier by push pins;

FIG. 21 is an enlarged vertical cross-sectional view of a tenth embodiment of the reinforcing member of the present invention which is similar to that shown in FIG. 20, but wherein the reinforcing material elements are attached to the carrier by bendable tabs formed along the margins of carrier;

FIG. 22 is a vertical cross-sectional view of an eleventh embodiment of the present invention positioned within a surrounding structural member showing the use of a C-shaped beam carrier having a thermally expansible reinforcing material element extending around the outer surfaces of the carrier and held in position adjacent the surrounding structural member for bonding to the top plate and side walls of the structural member;

FIG. 23 is a vertical cross-sectional view of a twelfth embodiment of the present invention positioned within a surrounding structural member showing the use of a C-shaped beam carrier having a first element of thermally expansible structural reinforcing material coupled to the interior of the carrier and a second element of thermally expansible structural reinforcing material coupled to the outer surface of the carrier;

FIG. 24 is a vertical cross-sectional view of a thirteenth embodiment of the present invention positioned within a surrounding structural member showing the use of a C-shaped beam carrier having a structural reinforcing material element which is unitary and slotted to extend into the open mouth of the carrier and around the upper and lower legs thereof; and FIG. 25 is a vertical cross-sectional view of a fourteenth embodiment of the present invention positioned within a surrounding structural member showing the use of a block shaped beam carrier having a structural reinforcing material element fastened thereto and extending around three sides thereof.

DESCRIPTION OF THE PREFERRED EMBODIMENTS

Figure 18:
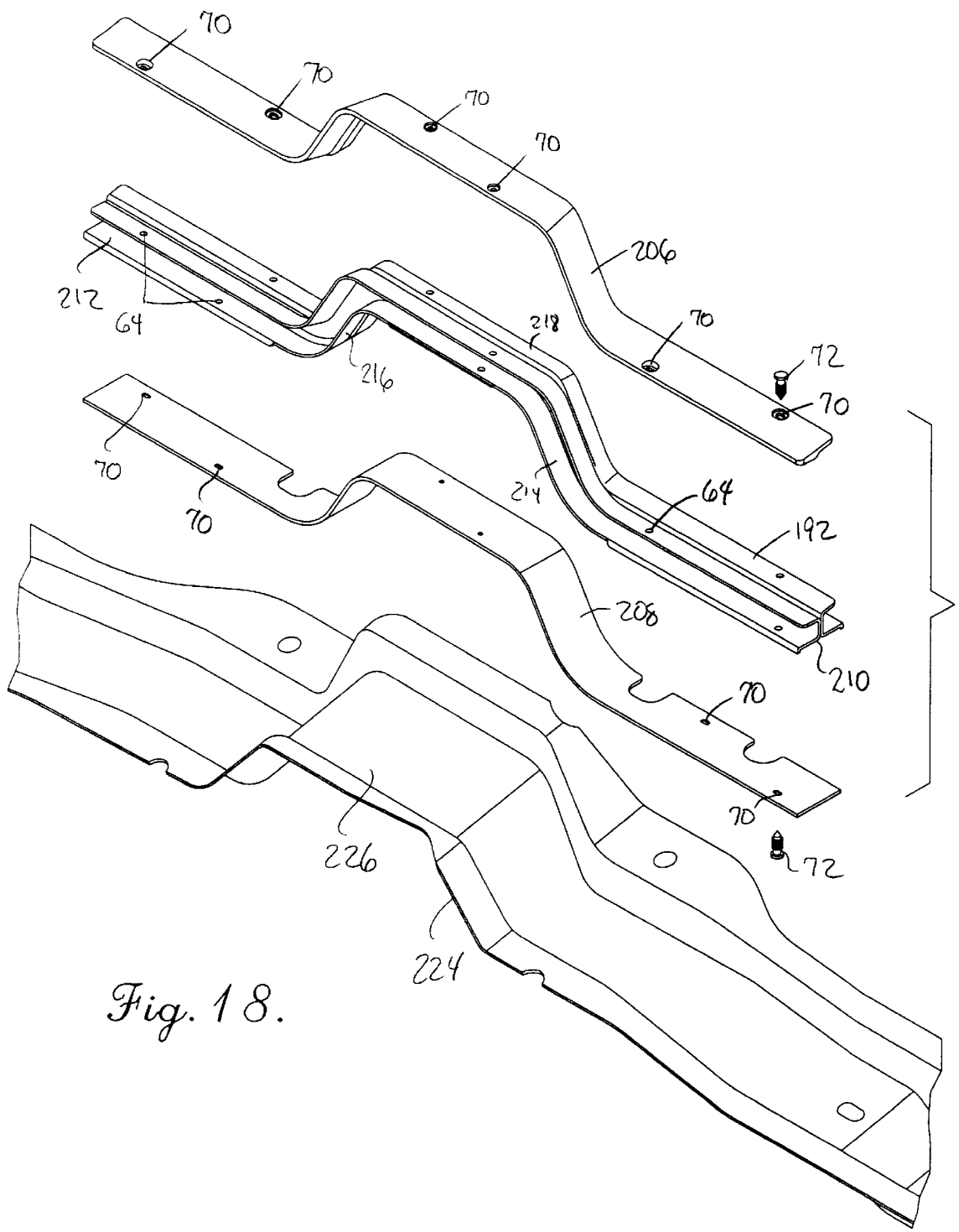
FIG. 18 is a perspective view showing a ninth embodiment of the reinforcing member of the present invention positioned within a channel-shaped structural member wherein the carrier includes at least one arcuate bend along its longitudinal length.
Figure 18:
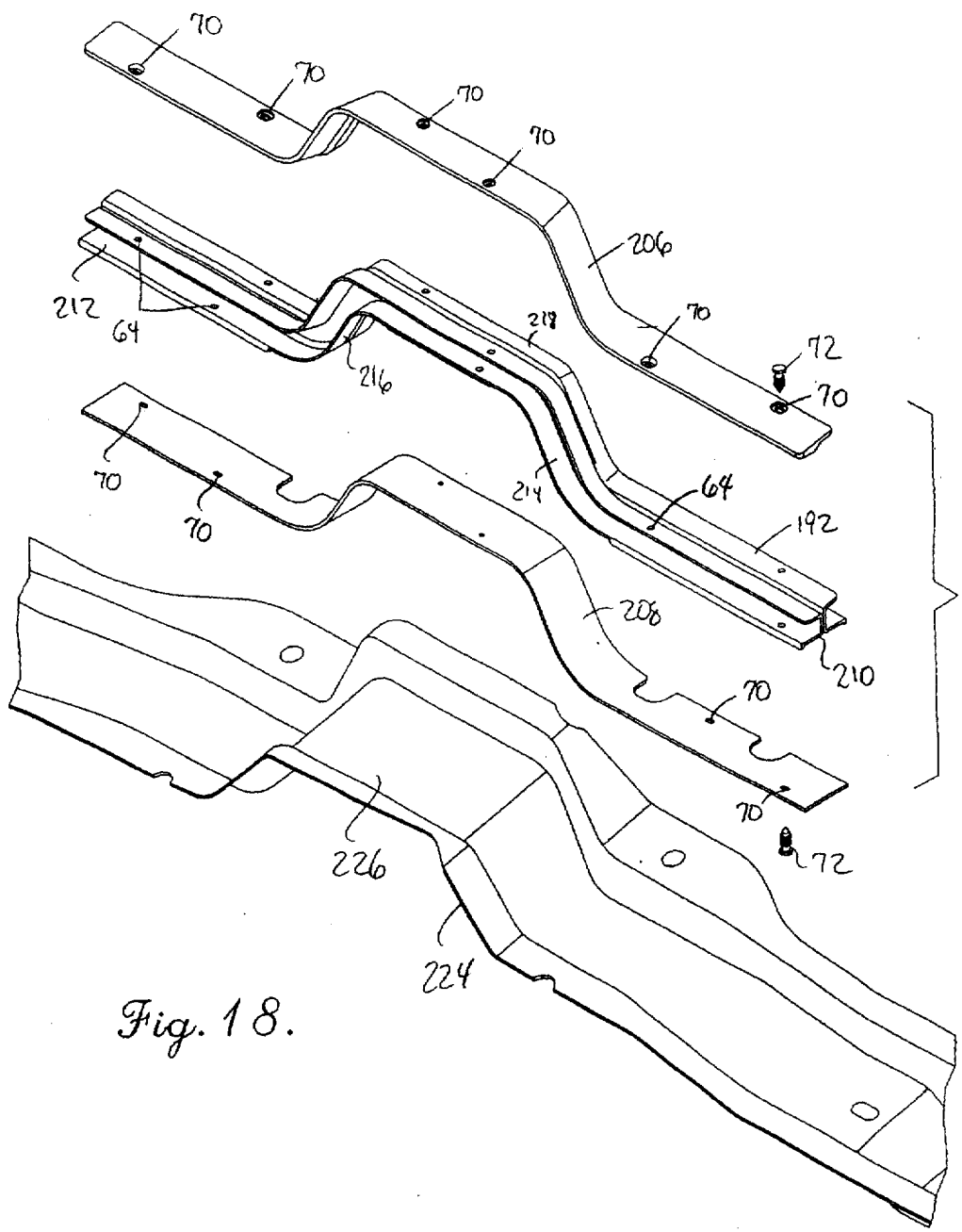

Referring now to the drawing, an automobile body 20 is shown which presents one field of use for the present invention. As noted above, architectural, marine and aviation applications are among the many which would benefit from internal reinforcement to thereby increase strength in critical areas while reducing overall weight. The automobile body 20 includes several interconnected frame elements that define a passenger compartment 22, trunk 24, doorways 26, windows 28, engine compartment 30 and wheel wells 32. The reinforcing members 34 of the present invention may be used at a variety of locations within the automobile, but the side rails 36 and cross-members within the engine compartment demonstrate one structural component needing reinforcement to provide stiffening. While a passenger vehicle is illustrated in FIG. 1, it may be appreciated that trucks are another type of automobile as defined in this application for receipt of the present invention.

One such reinforcing member 34a is shown in FIGS. 2 and 3 and includes a carrier 38, thermally expansible structural reinforcing material 39 provided in reinforcing elements 40 and 42, and fastener 44. The side rails 36 are typically enclosed, such as by a plate 46 which is shown as a floor pan 48 being positioned onto the channel 50 of the side rail 36. The channel 50 includes a base wall 52 and two upright and substantially parallel sidewalls 54 and 56.

One particularly preferred composition for use as material 39 is commercialized under the name SikaReinforcer (Sika Corporation, Madison Heights, Mich.). In more detail, the most preferred material 39 comprises: from about 20–30% by weight of a styrene-butadiene-styrene (SBS) block co-polymer (e.g., Fina Clear 530®); from about 5–20% by weight of a polystyrene (e.g., Fina Crystal 500® and Fina Crystal 535®); from about 30–45% by weight of a bisphenol A-based liquid epoxy resin (e.g. Araldite 6010® and Epon 71®); from about 0.5–5% by weight of a pigment such as carbon black; tip to about 5% by weight butadiene acrylonitrile rubber (Nipol 1411); from about 1–10% by weight hydrated amorphous silica (HiSil 233); from about 10–20% by weight glass microspheres (Scotchlite S60); from about 0.1–5% by weight of a blowing agent such as azodicarbonamide (e.g., Celogen AZ 765®, Celogen AZ 754A®, and Celogen AZ 130®); from about 0.1–5% by weight of a catalyst such as N, N, dimethyl phenyl urea (U405); from about 0.1–5% by weight of a curing agent such as dicyandiamide (DDA10); and up to about 5% by weight of a "kicker" such as zinc oxide to lower the blowing temperature, with all percents by weight being based upon the total weight of the material taken as 100% by weight.

A particularly preferred composition of the material 39 comprises about 12.94% polystyrene, about 23.22% SBS block copolymer, about 0.57% carbon black, about 1.90% butadiene acrylonitrile rubber, about 4.28% hydrated amorphous silica, about 38.07% bisphenol A-based liquid epoxy resin, about 14.75% glass microspheres, about 0.46% zinc oxide, about 2.85%dicywidiamide, about 0.38% N, N diimetlhyl phenyl urea, and about 0.57% azodicarbonamide. In certain applications where increased compressive strength and reduced foaming and expansion is desired, the foregoing may be adjusted such that the polystyrene is reduced to about 12.63%, the SBS block copolymer is reduced to about 22.59%, and the butadiene acrylonitrile rubber is increased to about 2.85%.

The material 39 can be formed by mixing the SIBS block co-polymer with a small portion (about 1/40th of the total amount) of the bisphenol A-based liquid epoxy resin in a heated mixer until the temperature of the mixer reaches from about 240–260° F. (the temperature of the mixture within the mixer is at least about 175° F.), and the mixture is substantially homo(geneous, at which time the polystyrene is added to the mixer and mixing is continued. After the polystyrene is substantially mixed with the SBS block co-polymer/epoxy resin mixture, the remainder of the bisphenol A-based epoxy resin is slowly added to the mixer, stopping, and starting the mixer as necessary, with the ingredients being thoroughly mixed to obtain a substantially homogeneous mixture. The desired amount of this mixture is placed in a heated mixer (set at a temperature of about 250° F.) and mixing is commenced. While mixing, the carbon black and rubber are added to the mixer and mixing is stopped once a homogeneous mixture is obtained within the mixer. Either the silica or glass microspheres is added to the mixer, and mixing is resumed and continued until the mixture is homogeneous. This step is repeated, adding the other of the silica or glass microspheres.

The temperature of the mixer is then set to a temperature below 160° F. the blowing agent(s), catalyst(s), kicker, and curing agent(s) are added, and mixing is resumed and continued only until the mixture is homogeneous. The resulting mixture is then preferably extruded into strands (at an extruder temperature of 170–180° F. and screw rotation speeds of about 400 rpm) and cut into pellets. The pellets are then injection molded at a temperature of about 180–200° F. using injection molding equipment designed to form the desired shape of the expandable member 12 to be attached to the carrier 38.

The carrier 38 is presented in the form of an I-beam which includes an upright web 58 and two parallel end walls 60 and 62 at the ends of the web. The end walls 60 and 62 each include a plurality of holes 64 therethrough. The carrier 36 presents a longitudinal axis which is aligned with and preferably extends along the longitudinal axis of the channel 50. The foamable material elements 40 and 42 are attached on the outwardly oriented surfaces 66 and 68 of end walls 60 and 62, respectively, thereby being oriented for engaging the cap 46 and base wall 52, respectively upon foaming. The foamable material elements 40 and 42 each include openings 70 aligned with the holes 64 through the carrier 38, to thereby receive mounting component 44. Mounting component 44 as used in the first embodiment shown in FIGS. 1 and 2 is a mechanical fastener such as a push pin 72, which may be of synthetic resin and have a shank extending through the foamable material elements 40 and 42 and through the carrier 38 so as to hold the elements 40 and 42 on the carrier 38 prior to foaming. The push pin 72, for example of nylon and having a higher melting temperature than the foamable material 39, may have ridges along the shank to grip the foamable material elements 40 and 42, and the holes 64 and openings 70 may be slightly larger than the shank to permit some limited flexibility to allow the foamable material elements 40 and 42 to absorb impact.

In use, the reinforcing member 34a is placed into the channel 50 whereby the foamable material clement 40 contacts the base wall 52 and the foamable material element 42 is in close proximity to the plate 46. Upon activation of the foamable material 39 by, for example, heating, the plate 46 is structurally bonded to the channel 50 with the reinforcing(g member adding rigidity thereto.

FIGS. 4 and 5 illustrate a second embodiment 34b of the reinforcing member. The carrier 38b and reinforcing material elements 40b and 42b are configured and positioned similarly to that shown in FIGS. 2 and 3, with the exception that no holes or openings are required. Foamable material elements 40b and 42b are instead fastened to the cattier 38b by mounting component 44b provided as structural tape 74. The structural tape 74 is known to those skilled in the art, and may be embedded in the elements 40 or 42 or provided with adhesive on both sides 76 and 78 thereof, and is provided as thin strips in order to maximize bonding of the thermally expansible reinforcing, material to the carrier after activation.

FIGS. 6 and 7 illustrate a third embodiment 34c of the reinforcing member. The carrier 80 thereof includes a central rectangular box beam 82, an upper web 84 and a lower web 86, each with a respective parallel end walls 60 and 62, again without holes therein. The box beam 82 presents a top panel 88, bottom panel 90, and side panels 92 and 94. The side panels 92 and 94 enable additional structural reinforcing elements 96 and 98 of thermally expansible structural reinforcing material 39 to be attached thereto using the structural tape 74, and thus permits additional bonding of the carrier to the side walls 54 and 56, respectively of the channel 50 and adds both horizontal and vertical reinforcement to the surrounding structural member to provide a reinforced structural member after foaming, expansion and bonding of the reinforcing material elements.

FIGS. 8 and 9 illustrate a fourth embodiment 34d of the reinforcing member. The carrier 100 presents opposed, parallel side panels 102 and 104, each having an upper edge 106 and a lower edge 108. Three substantially parallel horizontal webs 110, 112, and 114 are positioned between the side panels 102 and 104 and positioned interiorly of the edges 106 and 108. The positioning of the uppermost web 100 and the lowermost web 114 present flanges 116 which serve as the mounting component 44 to fasten the elements to the carrier. Central web 112 also lies in a horizontal plane as viewed in FIGS. 8 and 9, but it may be appreciated that the carrier 100 may be oriented 90° to that shown. The thermally expansible structural reinforcing material 39 is provided as side reinforcing material elements 118 and 120 coupled by adhesive 121 to the outer faces of the side panels 104 and 106, and upper reinforcing material element 122 and lower reinforcing material element 124 are mounted by their nibs 126 which frictionally engage the flanges 116 to hold the upper and lower reinforcing material elements in place. After foaming, expansion and bonding of the elements, the carrier 100 is bonded to both the plate and the channel to provide a reinforced structural member.

FIGS. 10 and 11 show a fifth embodiment 34e of the reinforcing member hereof, which is similar to the embodiment 34b shown in FIGS. 4 and 5. The I-beam carrier 38e is oriented at 90° to that shown in FIGS. 2 and 3 whereby thermally expansible structural reinforcing material 39 is provided as left and right side structural reinforcing material elements 128 and 130 on respective parallel and opposed left and right end walls 132 and 134 interconnected by web 136. Structural tape 74 is the mounting component which fastens the elements 128 and 130 to the carrier 38. The lower edge 136 of each of the end walls is supported on the base wall 52 and upon foaming expansion and bonding, the elements 128 and 130 foam and expand to engage and bond the carrier 38e to the sidewalls 54 and 56, and may expand upwardly to bond the plate 46 to the channel 50 as a reinforced structural member.

FIGS. 12 and 13 illustrate a sixth embodiment 34f of the reinforcing member hereof, similar to the fifth embodiment built wherein the carrier 132 is modified whereby each of the first and second end walls 134 and 136 are provided with end flanges 138, 140, 142 and 144 which are horizontally oriented. End flanges 138 and 140 are co-planar and opposite plate 46, and end flanges 142 and 144 are co-planar, parallel to the end flanges 138 and 140, and opposite base wall 52. The thermally expansible structural reinforcing material 39 is provided in left and right side structural reinforcing material elements 146 and 148 are connected to the left and right end walls by push pins 72, and also by push pins 72 on end flange structural reinforcing material elements 150, 152, 154 and 156. The push pins 72 function as described in reference to the embodiment shown in FIGS. 2 and 3, wherein holes are provided in the carrier which are aligned with openings in the foamable material elements to receive the mechanical fasteners therethrough. Preferably, at least two mechanical fasteners are provided for each element to maintain alignment. After foaming, expansion and bonding, the thermally expansible structural reinforcing material bonds the carrier to the channel and plate to provide a resulting reinforced structural member.

FIGS. 14 and 15 illustrate a seventh embodiment 34g of the reinforcing member of the present invention, wherein the carrier 132 is shown oriented 90° relative to its position shown in FIGS. 12 and 13, and wherein the thermally expansible structural reinforcing material 39 is provided in upper and lower structural reinforcing material elements 158 and 160. The upper element 158 extends around corners 162 and 164 to overly end flanges 138 and 142, while the lower element 160 extends around corners 166 and 168 to overly end flanges 140 and 144. The elements 158 and 160 may be temporarily secured to the carrier 132 by narrow lines of adhesive 170 applied intermediate the carrier 132 and the elements 158 and 160, as after foaming the material 39 itself bonds to the carrier. The upper and lower structural reinforcing material elements 158 and 160 then not only also bond to the cap 46 and the base wall 52, respectively, but also too sidewalls 54 and 56. Further, the end flanges resist lateral displacement and dislodgement of the structural reinforcing material elements 148 and 150 as viewed in FIG. 14. After foaming, expansion and bonding, the elements bond the carrier to the plate and channel to provide a reinforced structural member.

FIGS. 16 and 17 illustrate an eighth embodiment 34h of the reinforcing member of the present invention, wherein the carrier 38 of FIGS. 2 and 3 is employed (again shown without holes), but the foamable material 39 is configured with upper structural reinforcing material element 172 and lower structural reinforcing material element 174 wrap around the respective end walls 60 and 62 to partially extend along the web-lacing sides of the end walls. The edges 176, 178, 180 and 182 of the end walls thus act as a fastener and are received in corresponding slots 184, 186, 188 and 190 in the foamable material to mechanically engage and hold the foamable material 39 to the carrier 38. Thin lines of adhesive 170 may be used as a further fastener to inhibit relative longitudinal movement between the carrier 38 and the upper and lower elements 172 and 174. The lines of adhesive may be narrow, as they are provided only to inhibit longitudinal movement of the elements prior to foaming, with the majority of the contact between the reinforcing material elements and walls 60 and 62 being free of adhesive to permit bonding therebetween. After foaming, expansion and bonding, the material 39 bonds the carrier to the plate and the channel to provide a reinforced structural member.

FIGS. 18, 19 and 20 illustrate a ninth embodiment 34i of the present invention, wherein the carrier 199 is configured to change in vertical elevation along its longitudinal length, and thus conform to a frame member of an automobile which presents a hump or bump therealong but nonetheless would benefit by reinforcement. The carrier 192 is generally I-beam shaped when viewed in section, as in FIG. 21, and may be a composite carrier formed by welding or fasting two generally C-shaped channels 193 and 194 back to back. The carrier 192 thus presents a generally upright web 196 and flanges 198, 200, 202 and 204 for receiving thereon thermally expansible structural reinforcing material 39 as upper structural reinforcing material element 206 and lower structural reinforcing material element 208. From a longitudinal standpoint, the carrier 192 includes lower arms 210 and 212, each continuing into a respective angled riser segments 214 and 216 which leads to raised midsection 218. The upper element 206 and lower element 208 are shaped complementally to be received on the flanges of and to conform longitudinally to the carrier. As shown in FIG. 21, the lower flanges 202 and 204 have terminal bends 220 and 222, respectively, in their outer margins in the lower arms and raised midsection, which serves to constrain the lower element 208 tlherebeneath during heating. A plurality of holes 64 are provided along the flanges of the carrier 192 and are aligned with openings 70 in the upper and lower structural reinforcing material elements to receive push pins 72 therethrough as described with reference to the first embodiment for retaining the foamable material thereon. The openings 70 include enlarged areas for receiving the heads of the push pins so that the foamable material in elements 206 and 208 may lie flush against the surrounding structure of the channel of a cross-member 224 or other frame component. The push pins 72 are preferably synthetic resin such as nylon which has a lower heat conductivity than metal, thereby providing both a blockage to convection through the openings and holes and avoiding localized high conductivity which might inhibit even expansion of the foamable material. In addition, the synthetic resin push pin helps to absorb shock resulting from impact to the foamable material during handling and installation. As may be seen in FIGS. 19 and 20, the frame member may be a generally u-shaped cross member 224 which receives the reinforcing member 34i in the channel defined therein over a humped section 226 generally midway along its length. It is to be understood that the frame member is provided with a covering plate which conforms to the upper edge of the cross-member 224, whereby upon foaming, expansion and bonding the material 39 bonds the carrier to the cross-member and covering plate to provide a reinforced structural member.

FIG. 21 illustrates a tenth embodiment of the reinforcing member 34j of the present invention which is similar in configurationl and use to that shown in FIGS. 18, 19 and 20. However, instead of fastening the reinforcing material elements 206 and 208 to the carrier by push pins, the carrier 228 formed of back-to-back C-shaped channels 230 and 232 have outwardly extending upper and lower arms 234 which include, at longitudinally spaced intervals along the remote margins of flanges 198 and 200, bendable tabs 236 which include a finger 238 extending over the outer surface of the elements 206 and 208 and a stretch 240 approximately the width of the element 206. Because of the provision of the terminal bends 220 and 222, the tabs 236a on flanges 202 and 204 include only fingers 238. The tabs 236 and 236a thereby secure the reinforcing material elements 204 and 206 to the carrier 228 prior to activation of the thermally expansible reinforcing material 39. After foaming, expansion, and bonding of the material 39, the carrier is bonded to the structural member as described above to provide a reinforced structural member.

FIG. 22 illustrates an eleventh embodiment of the reinforcing member 34k of the present invention, showing the use of a C-shaped beam carrier 242 which is secured to the plate 46 by rivets 244. The beam carrier 242 is provided with two elongated longitudinally extending walls which, when viewed in section appear as arms 246 and 248 and a connecting wall 250, with inwardly turned flanges 252 of the C-shaped beam carrier 242 presenting an open mouth 254 oriented downwardly whereby the arms 246 and 248 are oriented toward the respective side walls 54 and 56 of the channel 50 and the connecting wall is oriented toward the plate 46. Thermally expansible structural reinforcing material 39 is provided as structural reinforcement material element 256 which extends around the outer facing surfaces of the arms 246 and 248 and connecting, wall 250 and is secured in place by push pins 72. After foaming, expansion and bonding, the carrier 242 is bonded to the channel 50 and the plate 46 to provide a reinforced structural member.

FIG. 23 illustrates a twelfth embodiment of the reinforcing member 34l, where the C-shaped beam carrier 242 is oriented substantially 90° to that shown in FIG. 22 and the arm 248 is secured to the plate 46 by rivets 244. The reinforcing member 341 uses the structural reinforcement material element 256 as described above, but adds a second structural material reinforcement material element 258 received through the open mouth 254 of the carrier and positioned between arms 246 and 248. The elements 256 and 258 are held in position prior to activation by push pins 72 which extend into a hole 260 in element 258 and grip against the sides of the hole. The use of two elements 256 and 258 permits the use of different reinforcing materials 39, if desired, and/or facilitates the bonding of the reinforcing member 341 to both side walls and the base wall of the channel, as well as the plate 46 when additional material 39 is used to enhance structural rigidity.

FIG. 24 illustrates a thirteenth embodiment of the reinforcing member 34m of the present invention, where a C-shaped beam carrier 262 is provided which is coupled to the plate 46 by, for example, threaded fasteners 264. The carrier 262 includes arms 266 and 268 joined by connecting wall 270. Thermally expansible structural reinforcing material 39 is provided as E-shaped reinforcing material element 272. The element includes a central block portion 274 received through the open mouth 276 of the carrier 262 into the interior thereof between the arms 266 and 268, and further includes legs 278 and 280 which extend over the exterior surfaces of the arms 266 and 268 and thus leg 278 is positioned between the carrier and the plate 46 and the leg 280 is positioned between the carrier and the base wall 52. Each leg 278 and 280 includes a shoulder 282 which extends past the arms to engage the connecting wall 270 and thereby aid in holding the element 272 in position. A push pin 72 may provide further attachment of the element 272 to the carrier prior to foaming, expansion and bonding, whereupon the carrier is bonded to the channel and the plate 46 to provide a reinforced structural member.

FIG. 25 illustrates a fourteenth embodiment of the reinforcing member 34n of the present invention wherein a block-beam shaped carrier 284 is provided. The block may be metal or, more advantageously, nylon or other synthetic resin material having a higher melting point than the bake temperature to which the reinforcing member 34j is subjected to activate the material 39. The carrier is provided with reinforcing material 39 as a reinforcing material element 256 as described above. The carrier 284 may be secured to the plate by push pins or screws 286 as illustrated, and additional push pins or screws 286 may be employed to retain the reinforcing material element 256 on the carrier 284 prior to foaming, expansion and bonding of the carrier 284 to the channel 50 and plate 46 by the reinforcing material 39 as described above to provide a reinforced structural member. The block shaped carrier 284 may be employed where maximum rigidity is desired to be provided by the carrier or where the particular material employed as the carrier necessitates a solid beam configuration. Alternatively, the block may be provided of synthetic resin or metal structural foams.

In use, the reinforcing member 34 as shown in any of the embodiments is initially position within a Structure such as a frame member to be reinforced. After positioning, the reinforcing member 34 may be held in position by wedging, by spot welding, adhesive, or a mechanical fastener if necessary to prevent movement prior to the expansion of the thermally expansible structural reinforcing material 39. It is especially beneficial that the thermally expansible structural reinforcing material 39 is initially dry and non-tacky for purposes of handling during application. Thus, a separate fastener, either as an adhesive connection or a mechanical connection between the carrier and the material 39 serves to retain it in position on the carrier prior to activation and expansion. Moreover, the carrier may be configured, as shown above, to direct or retain the thermally expansible structural reinforcing material 39 while the latter is flowable. The material 39 is activated, for example by elevating its temperature in an oven, whereby it expands and adhesively bonds to both the carrier and to the surrounding structural member. After cooling or other curing, the bond between the foamable material and both the carrier and the structural member is substantial, such that the foamable material provides substantial stiffening for structural rigidity and vibration dampening.

Although preferred forms of the invention have been described above, it is to be recognized that such disclosure is by way of illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of his invention as pertains to any apparatus not materially departing from but outside the literal scope of the invention as set out in the following claims.

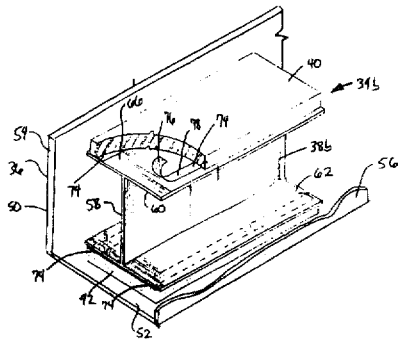

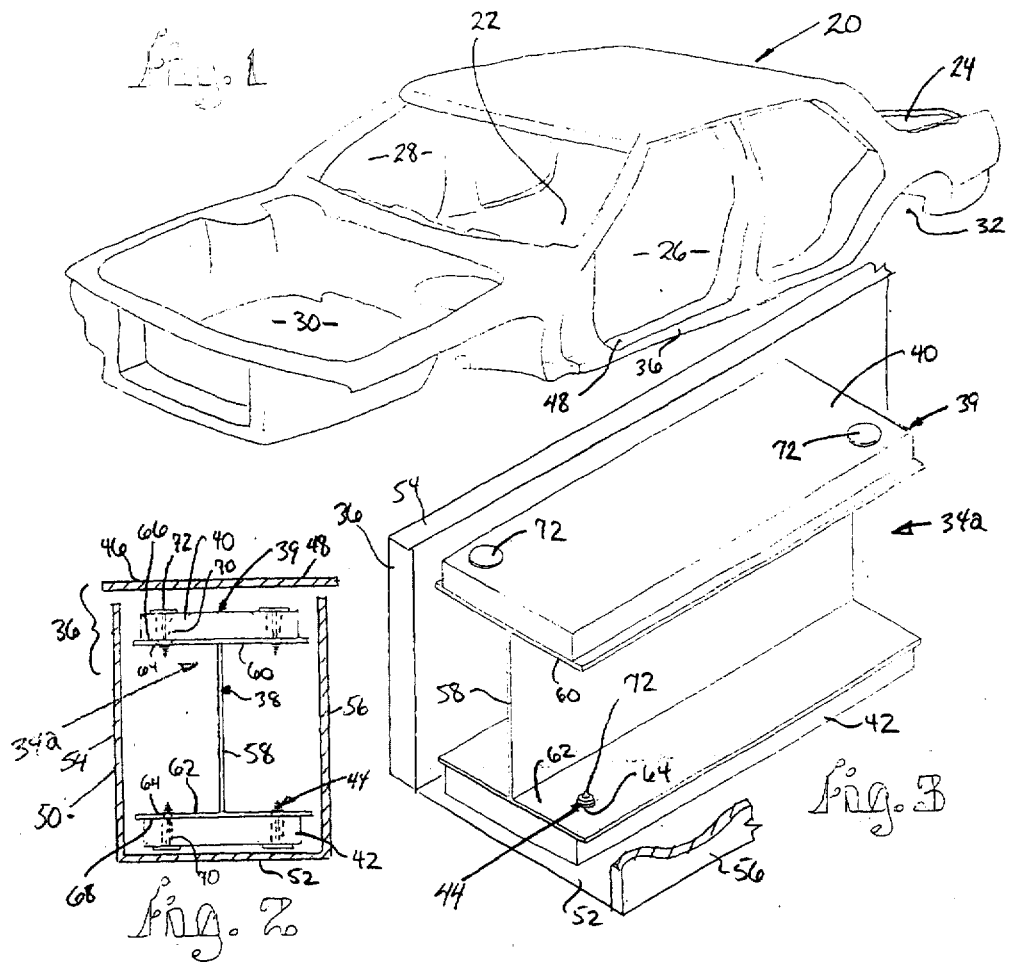
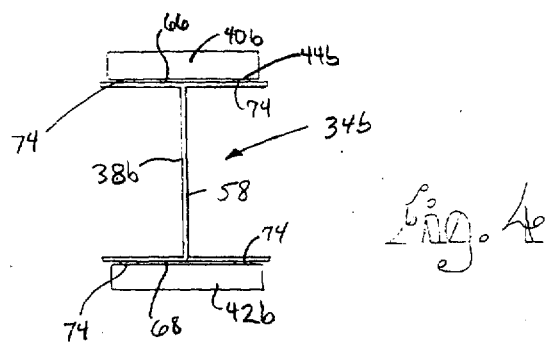

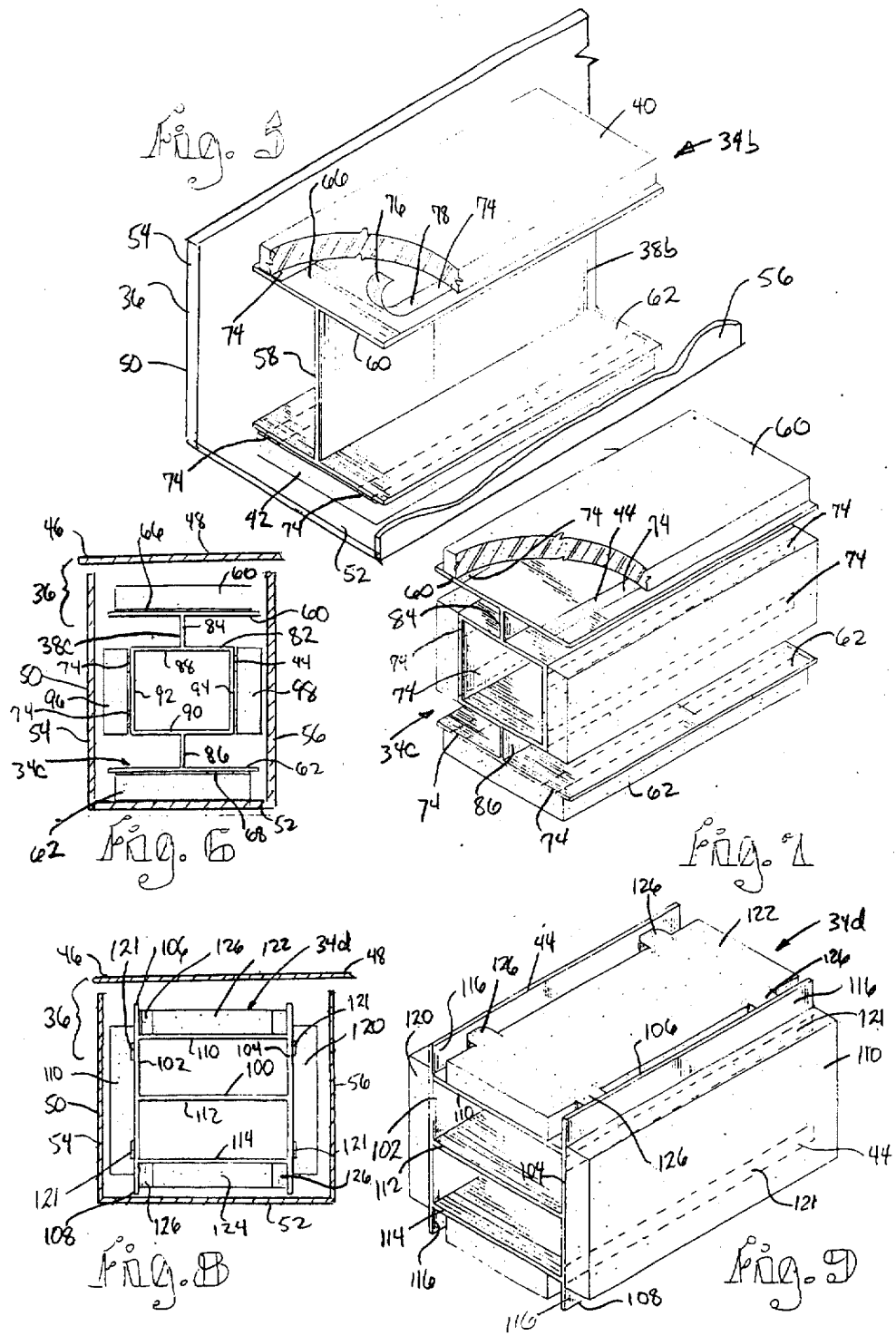

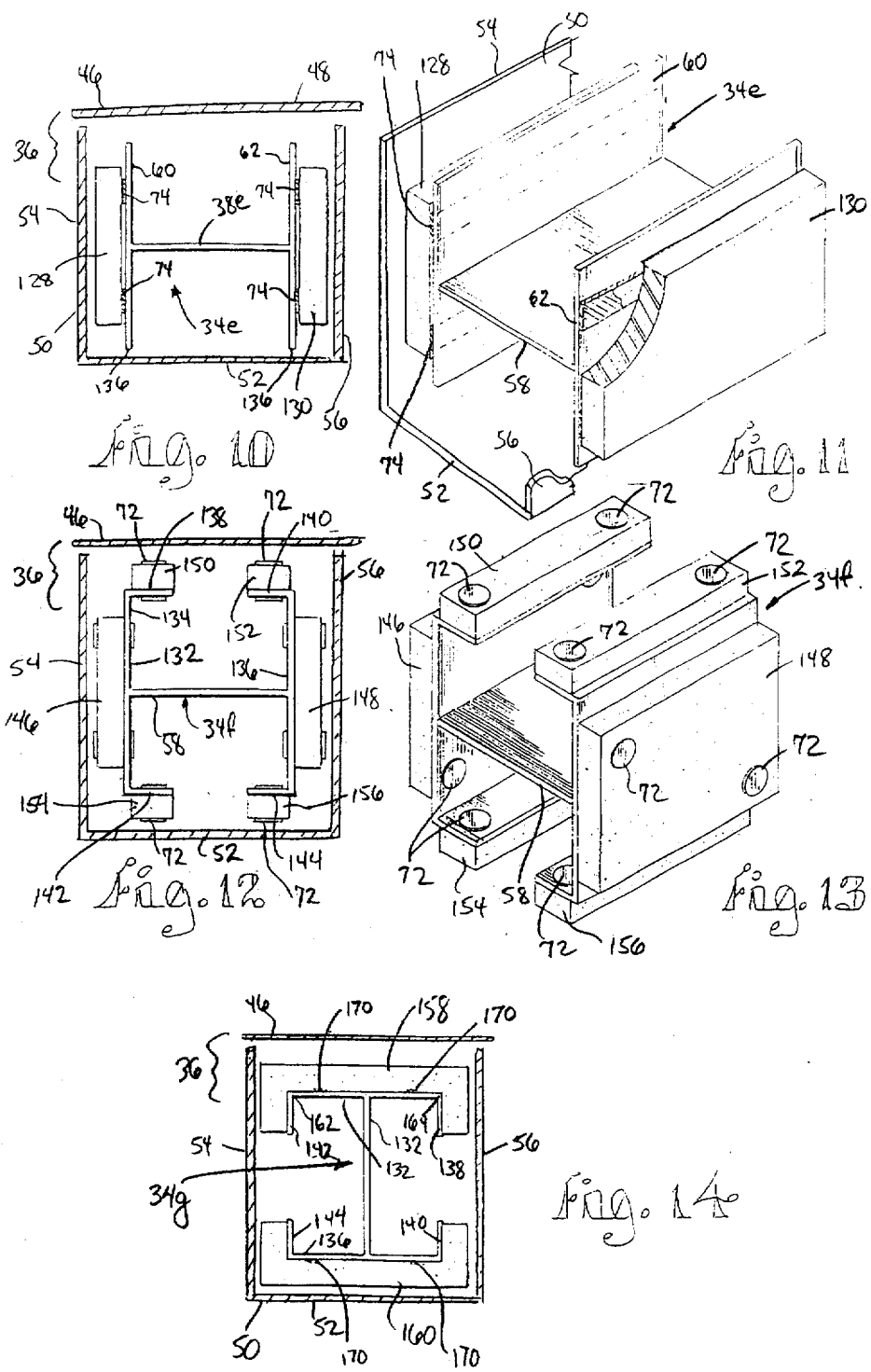

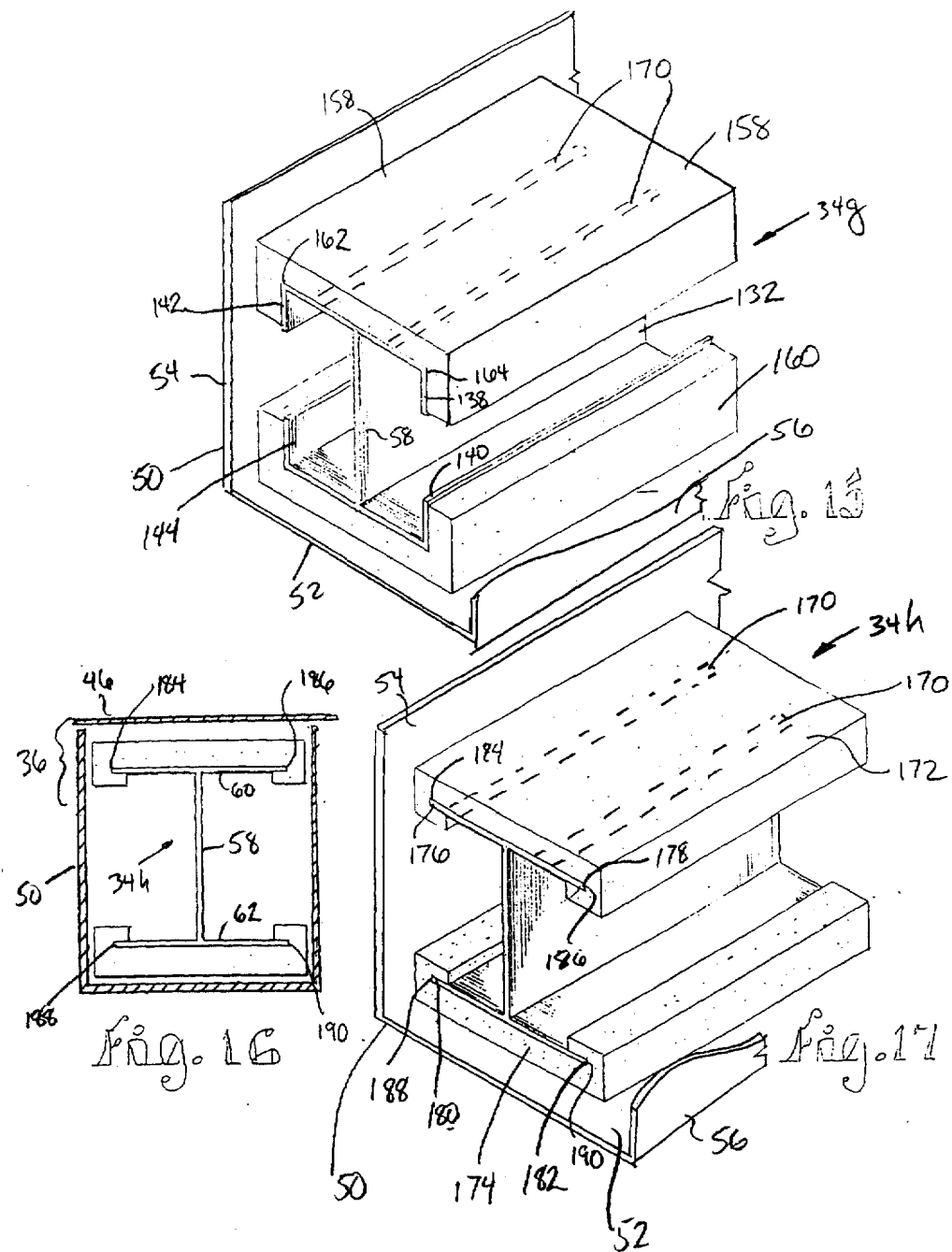

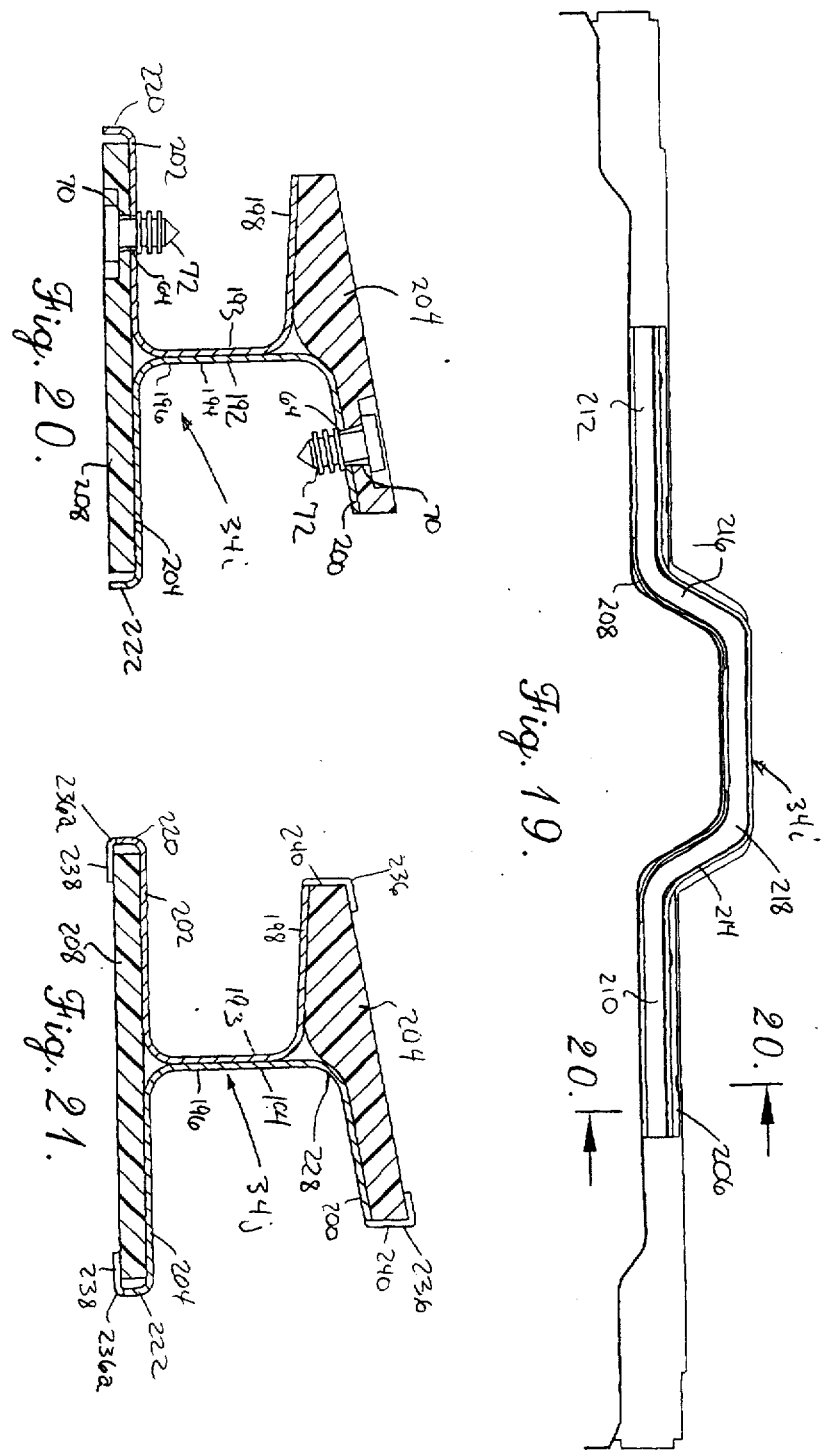

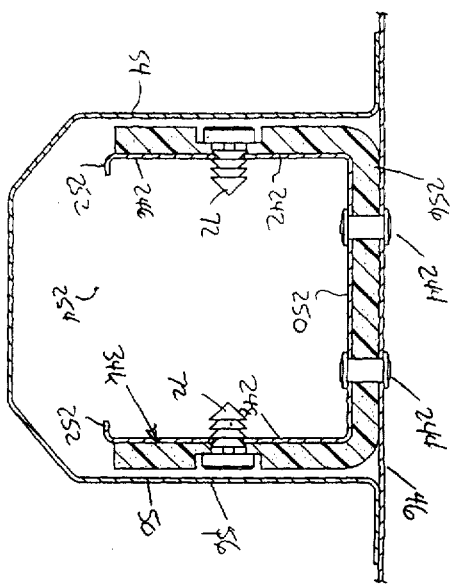
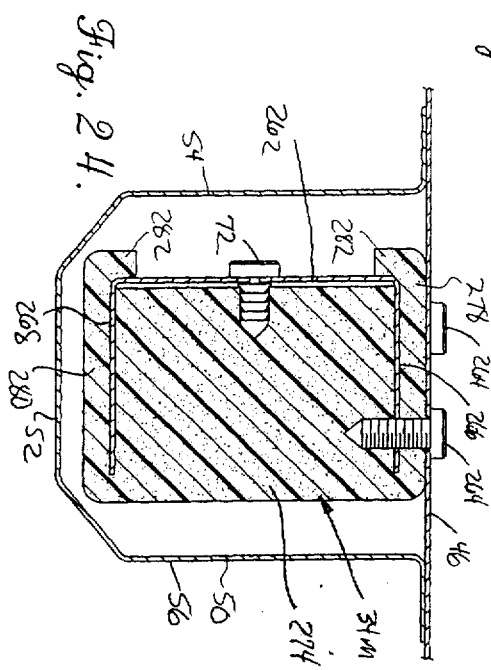
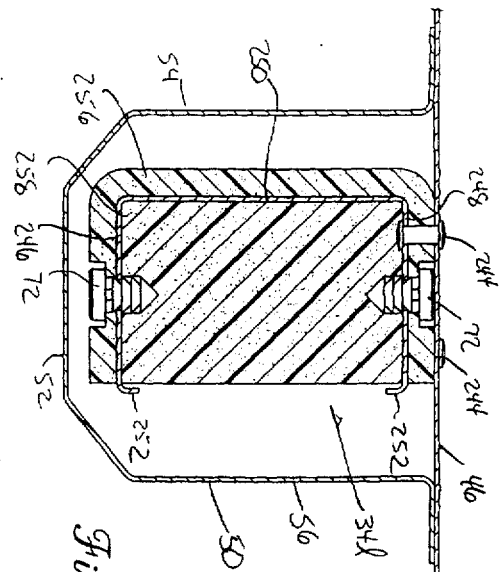
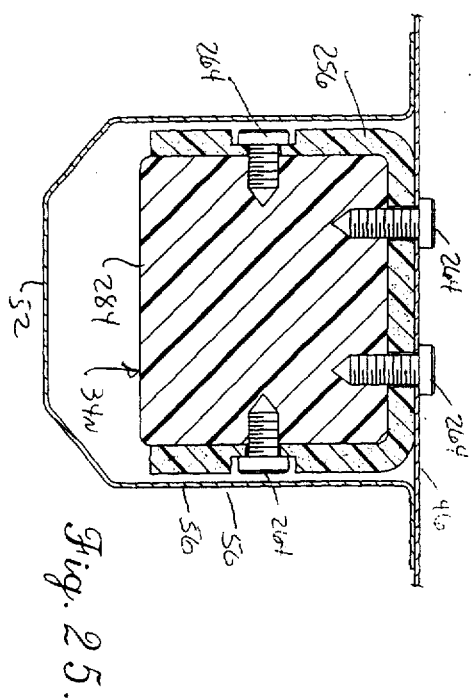

What is claimed is:

1. In combination,
   a structural member presenting a base wall and at least one side wall defining a channel therein, and a plate for enclosing said channel; and
   a reinforcing member positioned in said channel, said reinforcing member including:
      a beam carrier having first and second spaced-apart end walls presenting respective first and second surfaces thereon and at least one wall intermediate and connecting said end walls;
      a thermally expansible reinforcing material element positioned in overlying relationship to at least one of said first and second surfaces and said wall and located in facing relationship to said structural member; and
      a fastening member separate from said carrier and said thermally expansible reinforcing material element for attaching said expansible material to said carrier but not said structural member, wherein upon foaming and expansion of said reinforcing material element, said carrier is bonded to said structural member.

2. The combination of claim 1, wherein the mounting means fastening member comprises a mechanical fastener.

3. The combination of claim 1, wherein the mounting means fastening member comprises a structural tape.

4. The combination of claim 1, wherein the mounting means fastening member comprises adhesive.

5. The combination of claim 1, wherein said carrier includes a rectangular box beam positioned intermediate the spaced apart end walls.

6. The combination of claim 5 including a second reinforcing material element and a second fastening member attaching said second reinforcing material element to said box beam.

7. The combination of claim 1, wherein said end walls have margins thereon and said carrier includes at least two flanges extending at an oblique angle from the margins of said end walls, second and third reinforcing material elements positioned on said flanges, and second and third fastening members for mounting said second and third reinforcing material elements to said flanges but not said structural member.

8. The combination of claim 1, wherein said end walls have margins thereon and said carrier includes at least two flanges extending at an oblique angle from the margins of said end walls, and wherein said reinforcing material element is fastened to said carrier by said fastening member to the respective surface and at least one flange of one end wall between said carrier and said structural member.

9. The reinforcing material of claim 1, wherein said reinforcing material comprises an SBS block co-polymer, a polystyrene, a rubber, a bisphenol A-based liquid epoxy resin, carbon black, silica, glass microspheres, a blowing agent, a catalyst, and a curing agent.

10. In combination,
    a structural member presenting a base wall and at least one side wall defining a channel therein, and a plate for enclosing said channel; and
    a first reinforcing member positioned in said channel, said reinforcing member including:
       a beam carrier having first and second spaced-apart surfaces and at least one wall intermediate and connecting said surfaces;
       a thermally expansible reinforcing material element positioned on overlying relationship to at least one of said first and second surfaces and said wall intermediate said surfaces and located in facing relationship to said structural member; and
       mounting means for attaching said expansible material to said carrier, wherein upon foaming and expansion of said reinforcing material element, said carrier is bonded to said structural member,
       wherein said carrier is substantially C-shaped in cross-section presenting a pair of arm walls defining said surfaces, said arm walls extending from said connecting wall in opposed relationship, and wherein said mounting means attaches said reinforcing material element in covering relationship to said arm walls with said element positioned intermediate said carrier arm walls, and
       a second thermally expansible reinforcing material element positioned intermediate said arm walls and extending substantially therebetween.

11. The combination of claim 10, wherein said second reinforcing material element is positioned in engagement with said arm walls.

12. The combination of claim 10, wherein said mounting means includes a mechanical fastener coupling both said first thermally expansible element and said second thermally expansible element to said beam carrier.

13. In combination,
    a structural member presenting a base wall and at least one side wall defining a channel therein, and a plate for enclosing said channel; and
    a first reinforcing member positioned in said channel, said reinforcing member including:
       a beam carrier having first and second spaced-apart surfaces and at least one wall intermediate said surfaces;
       a thermally expansible reinforcing material element positioned on overlying relationship to at least one of said first and second surfaces and said wall intermediate said surfaces and located in facing relationship to said structural member, and
       mounting means for attaching said expansible material to said carrier, wherein upon foaming and expansion of said reinforcing material element, said carrier is bonded to said structural member,
       wherein said carrier is substantially C-shaped in cross-section presenting a pair of arm walls defining said surfaces, said arm walls extending from said connecting wall in opposed relationship, and wherein said reinforcing material element is substantially E-shaped including a pair of legs positioned in overlying relationship to said arm walls and intermediate said carrier and said structural member.

14. A reinforcing member for reinforcing a structural member comprising:
    a beam carrier having first and second spaced-apart surfaces and at least one wall intermediate and connecting said surfaces;

a thermally expansible reinforcing material element positioned on overlying relationship to at least one of said first and second surfaces and said wall intermediate said surfaces and located in facing relationship to said structural member; and mounting means for attaching said expansible material to said carrier, wherein upon foaming and expansion of said reinforcing material element, said carrier is bonded to the structural member, wherein said carrier is substantially C-shaped in cross-section presenting a pair of arm walls defining said surfaces, said arm walls extending from said connecting wall in opposed relationship, and wherein said mounting means attaches said reinforcing material element in covering relationship to said arm walls with said element positioned intermediate said carrier arm walls, and a second thermally expansible reinforcing material element positioned intermediate said arm walls and extending substantially therebetween.

15. The reinforcing member of claim 14, wherein said second reinforcing material element is positioned in engagement with said arm walls.

16. The reinforcing member of claim 14, wherein said mounting means includes a mechanical fastener coupling both said first thermally expansible element and said second thermally expansible element to said beam carrier.

17. A reinforcing member for reinforcing a structural member comprising:

a beam carrier having first and second spaced-apart surfaces and at least one wall intermediate said surfaces;

a thermally expansible reinforcing material element positioned in overlying relationship to at least one of said first and second surfaces and said wall and located in facing relationship to said structural member; and fastening means for attaching said expansible material to said carrier, wherein said carrier is substantially C-shaped presenting a pair of arm walls defining said surfaces, said arm walls extending from said connecting wall in opposed relationship, and wherein said reinforcing material element is substantially E-shaped including a pair of legs positioned in overlying relationship to said arm walls.

18. The reinforcing member of claim 17, wherein said reinforcing material comprises an SBS block co-polymer, a polystyrene, a rubber, a bisphenol A-based liquid epoxy resin, carbon black, silica, glass microspheres, a blowing agent, a catalyst, and a curing agent.

19. A reinforcing member for reinforcing a structural member comprising:

an elongated beam carrier having first and second spaced-apart generally oppositely facing surfaces and at least one wall intermediate said surfaces, said beam presenting along its longitudinal length a first lower leg segment and a raised segment oriented generally parallel to and longitudinally spaced from said lower leg segment and a first intermediate segment connecting the lower leg segment and the raised segment and angled longitudinally with respect thereto;

first and second elongated thermally expansible reinforcing material elements positioned in overlying relationship to each of said oppositely facing surfaces; and at least one fastener attaching each of said thermally expansible reinforcing elements respectively to said first and second spaced-apart oppositely facing surfaces of said beam carrier whereby said thermally expansible reinforcing elements generally conform to said beam carrier along said lower leg portion, intermediate segment and raised segment.

20. A reinforcing member as set forth in claim 19, wherein said fastener is a mechanical fastener.

21. A reinforcing member as set forth in claim 19, wherein said beam carrier is substantially I shaped in cross-section.

22. A reinforcing member as set forth in claim 19, wherein said beam carrier is substantially C shaped in cross-section.

23. A reinforcing member as set forth in claim 19, wherein said beam carrier includes a second lower leg segment and a second intermediate section longitudinally on the other side of said raised segment from said first lower leg segment and said first intermediate section wherein said beam carrier is substantially U-shaped along its longitudinal length.

24. In combination:

a structural member presenting a base wall and at least one side wall defining a channel therein, and a plate for enclosing said channel; and a reinforcing member positioned in said channel, said reinforcing member including:

an elongated beam carrier having first and second spaced-apart generally oppositely facing surfaces and at least one wall intermediate said surfaces, said beam presenting along its longitudinal length a first lower leg segment and a raised segment oriented generally parallel to and longitudinally spaced from said lower leg segment and a first intermediate segment connecting the lower leg segment and the raised segment and angled longitudinally with respect thereto;

first and second elongated thermally expansible reinforcing material elements positioned in overlying relationship to each of said oppositely facing surfaces; and at least one fastener attaching each of said thermally expansible reinforcing elements respectively to said first and second spaced-apart oppositely facing surfaces of said beam carrier whereby said thermally expansible reinforcing elements generally conform to said beam carrier along said lower leg portion, intermediate segment and raised segment.

25. The combination of claim 24, wherein said fastener is a mechanical fastener.

26. The combination of claim 24, wherein said beam carrier is substantially I shaped in cross-section.

27. The combination of claim 24, wherein said beam carrier is substantially C shaped in cross-section.

28. The combination of claims 24, wherein said beam carrier includes a second lower leg segment and a second intermediate section longitudinally on the other side of said raised segment from said first lower leg segment and said first intermediate section wherein said beam carrier is substantially U-shaped along its longitudinal length.

* * * * *

UNITED STATES PATENT AND TRADEMARK OFFICE
CERTIFICATE OF CORRECTION

PATENT NO. : 6,305,136 B1
DATED : October 23, 2001
INVENTOR(S) : Hopton et al.

It is certified that error appears in the above-identified patent and that said Letters Patent is hereby corrected as shown below:

Title page,
The title page showing an illustrative figure should be deleted, and substitute therefore the attached title page consisting of Figs. 1-25

Drawings,
The drawing sheet consisting of fig.(s) 1-25 should be deleted and substitute therefore the attached drawing sheets 2-9.

Signed and Sealed this

Twenty-eighth Day of May, 2002

Attest:

*Attesting Officer*

JAMES E. ROGAN
*Director of the United States Patent and Trademark Office*

(12) United States Patent
Hopton et al.

(10) Patent No.: US 6,305,136 B1
(45) Date of Patent: Oct. 23, 2001

(54) REINFORCING MEMBER WITH BEAM SHAPED CARRIER AND THERMALLY EXPANSIBLE REINFORCING MATERIAL

(75) Inventors: Gregory W. Hopton, Novi, MI (US); Norman E. Blank, Wayne, NJ (US); Gerald Fitzgerald, Clinton Township, MI (US); Randy Stratman, Waterford, MI (US); Chin-Jui Chang, Troy, MI (US)

(73) Assignee: Sika Corporation, Madison Heights, MI (US)

( * ) Notice: Subject to any disclaimer, the term of this patent is extended or adjusted under 35 U.S.C. 154(b) by 0 days.

(21) Appl. No.: 09/496,001

(22) Filed: Jan. 31, 2000

(51) Int. Cl.$^7$ .................................................. E04C 1/00
(52) U.S. Cl. ................ 52/309.7; 52/309.8; 296/203.01; 296/205; 296/182; 296/146.6
(58) Field of Search ............................. 296/182, 203.01, 296/205, 146.6; 52/481.1, 309.7, 309.8, 793.1, 729.1, 730.2, 309.4

(56) References Cited

U.S. PATENT DOCUMENTS

| | | | |
|---|---|---|---|
| 3,434,258 | * | 3/1969 | Leurent .................................. 52/397 |
| 3,493,257 | | 2/1970 | Fitzgerald et al. .................... 293/71 |
| 4,019,301 | | 4/1977 | Fox ........................................ 52/725 |
| 4,610,836 | | 9/1986 | Wycech ................................ 264/313 |
| 4,695,343 | | 9/1987 | Wycech ................................ 156/196 |
| 4,732,806 | | 3/1988 | Wycech ................................ 428/241 |
| 4,737,407 | | 4/1988 | Wycech ................................ 428/323 |
| 4,751,249 | | 6/1988 | Wycech ................................ 521/54 |
| 4,769,391 | | 9/1988 | Wycech ................................ 521/54 |
| 4,836,516 | | 6/1989 | Wycech ................................ 267/279 |
| 4,853,270 | | 8/1989 | Wycech ................................ 428/68 |
| 4,861,097 | | 8/1989 | Wycech ................................ 296/188 |
| 4,862,660 | * | 9/1989 | Raymond .............................. 52/221 |
| 4,901,500 | | 2/1990 | Wycech ................................ 52/793 |
| 4,908,930 | | 3/1990 | Wycech ................................ 29/527.2 |

(List continued on next page.)

FOREIGN PATENT DOCUMENTS

| | | | |
|---|---|---|---|
| 2114888 | | 2/1994 | (CA) . |
| 2749263 | * | 5/1996 | (FR) ..................................... 296/187 |
| 11-13186 | * | 1/1999 | (JP) ........................................ 52/22 |

OTHER PUBLICATIONS

Side view photograph of admitted prior art automobile rail reinforcing member with adhesively attached thermally expandable reinforcing material after bake-out but not shown positioned within the rail.

Perspective view of admitted prior art automobile rail reinforcing member with adhesively attached thermally expandable reinforcing material after bake-out but not shown positioned within the rail.

Photograph of section of admitted prior art SUV crossmember reinforcing member with adhesively attached thermally expandable material after bake-out located between metal structural parts of an automobile.

*Primary Examiner*—Carl D. Friedman
*Assistant Examiner*—N. Slack
(74) *Attorney, Agent, or Firm*—Hovey, Williams, Timmons & Collins

(57) ABSTRACT

A reinforcing member for a structural component such as a rail or channel of a vehicle is provided which includes a carrier and a thermally expansible structural reinforcing material element which is fastened to the carrier by mechanical fixation or an adhesive. The mechanical fixation may be provided by a flange or other mechanical connection on the carrier or by a fastener such as a push pin extending through aligned holes and openings in the carrier and foamable material. The push pins are preferably of a synthetic resin material which more closely approximates the heat conductivity of the foamable material when the latter is activated by heat, and is sufficiently yieldable to absorb impacts to the foamable material during installation.

28 Claims, 7 Drawing Sheets